United States Patent
Thompson

[15] 3,658,135
[45] Apr. 25, 1972

[54] ROTARY TILLER WITH BACKUP PLATE FURROWING MEANS

[72] Inventor: Harold D. Thompson, 5834 Allison Road, Houston, Tex. 77048

[22] Filed: Aug. 22, 1969

[21] Appl. No.: 852,177

[52] U.S. Cl............172/42, 172/64, 172/72, 172/116, 172/119, 172/200, 172/532, 37/81
[51] Int. Cl..............A01b 33/02, A01b 21/08, A01b 49/00
[58] Field of Search............172/42, 50, 51, 63, 72, 112, 172/113, 116, 118–120, 701, 174–175, 177, 122, 123, 195, 200, 71, 765, 531–532, 540, 542, 549; 37/43 E, 43 G, 190, 43, 81; 52/157; 175/394

[56] References Cited

UNITED STATES PATENTS

| | | | |
|---|---|---|---|
| 292,550 | 1/1884 | Fairly | 172/532 |
| 2,539,053 | 1/1951 | Blackledge | 172/120 |
| 2,836,111 | 5/1958 | Hobson | 172/120 |
| 3,041,749 | 7/1962 | Lamy | 172/52 |
| 3,091,873 | 6/1963 | West | 172/119 |
| 3,119,193 | 1/1964 | Herschberger | 172/119 |
| 3,375,878 | 4/1968 | Dorn | 172/119 |
| 3,362,092 | 1/1968 | Speicher et al. | 172/119 |
| 3,503,450 | 3/1970 | Day | 172/119 |
| 3,442,335 | 5/1969 | Silbereis et al | 172/43 |
| 1,225,547 | 5/1917 | Willson | 172/119 |
| 1,810,069 | 6/1931 | Bosworth | 37/190 |
| 2,379,469 | 7/1945 | Bagan | 172/113 |
| 2,408,361 | 10/1946 | Bagan | 172/112 |
| 2,692,445 | 10/1954 | Darnell | 172/42 |
| 3,202,221 | 8/1965 | Monk et al | 172/63 |
| 3,398,470 | 8/1968 | Pool et al | 37/43 |
| 3,477,514 | 11/1969 | Woitas | 172/42 |
| 3,483,929 | 12/1969 | MacIntyre | 172/42 |

FOREIGN PATENTS OR APPLICATIONS

| | | | |
|---|---|---|---|
| 209,268 | 2/1956 | Australia | 172/42 |
| 857,923 | 1/1961 | Great Britain | 172/119 |
| 999,908 | 7/1965 | Great Britain | 172/123 |
| 75,031 | 12/1961 | France | 172/532 |
| 201,327 | 12/1958 | Austria | 172/41 |
| 984,351 | 2/1965 | Great Britain | 172/119 |
| 8,658 | 6/1961 | Japan | 172/42 |

OTHER PUBLICATIONS

Ed Robinson, "Power Gardening and Power Composting with Model T Roto-ette"; Oct. 6, 1950; pp. 12–13, 35, 42.
"Model T Roto-ette"; Oct. 6, 1950; pp. 1,3,7.

*Primary Examiner*—Robert E. Pulfrey
*Assistant Examiner*—C. W. Hanor
*Attorney*—Jack W. Hayden

[57] ABSTRACT

In a first embodiment, tapered auger mechanisms are mounted on transversely extending shaft members rotatably supported below the forward portion of a self-propelled, manually guided body structure upon which is mounted a motor which is coupled to the shaft members for causing rotation thereof. A rearward wheel assembly provides rearward support for the body structure. In a further embodiment, the auger mechanism and shaft members are adapted to be coupled to and drawn by a self-propelled tractor unit. In a further embodiment, the shaft members with the tapered auger mechanisms thereon and a curved guide plate are provided as attachments for a garden tiller to form rows in the earth as it passes thereover.

19 Claims, 7 Drawing Figures

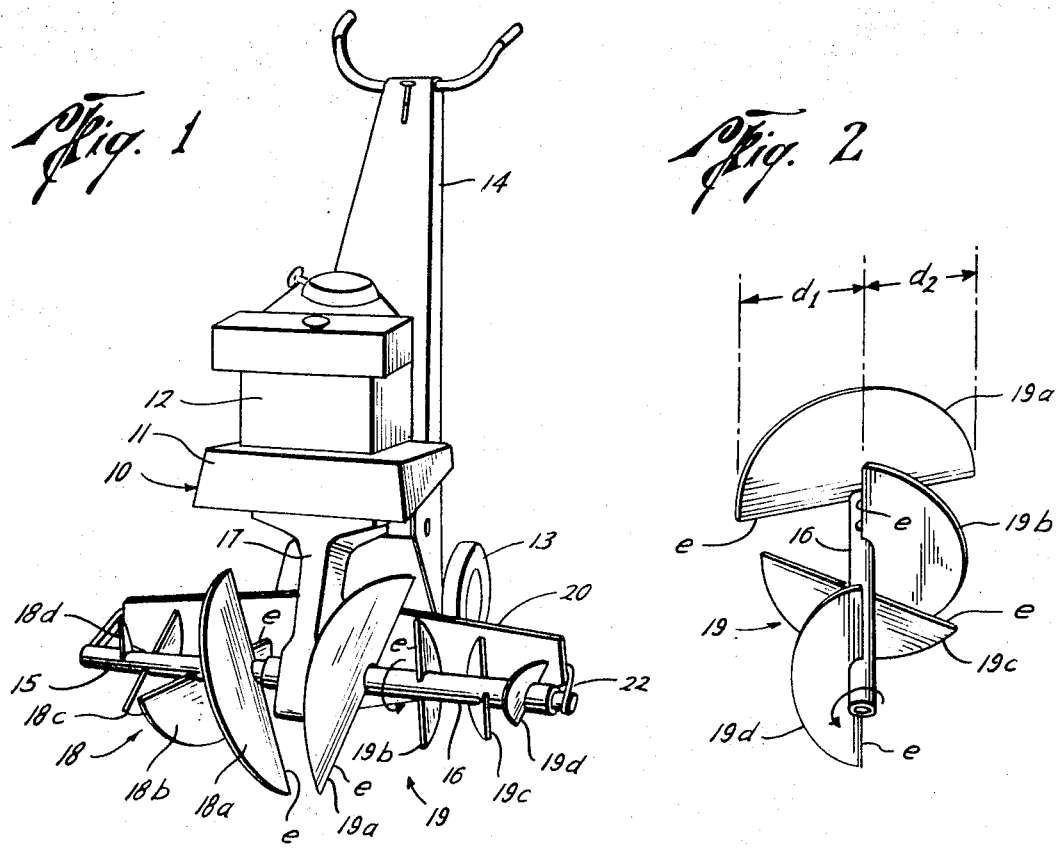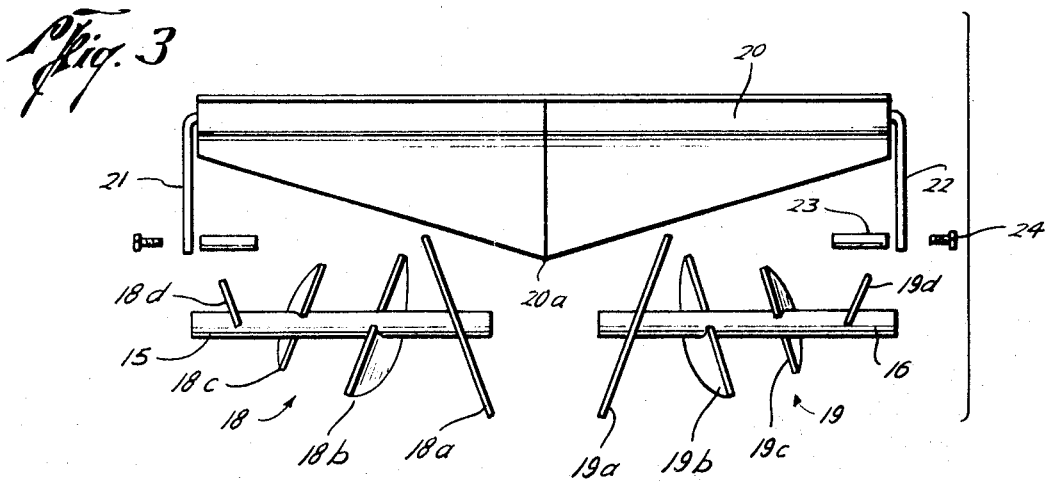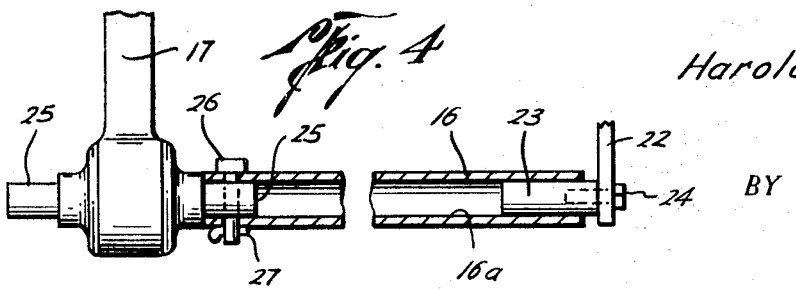

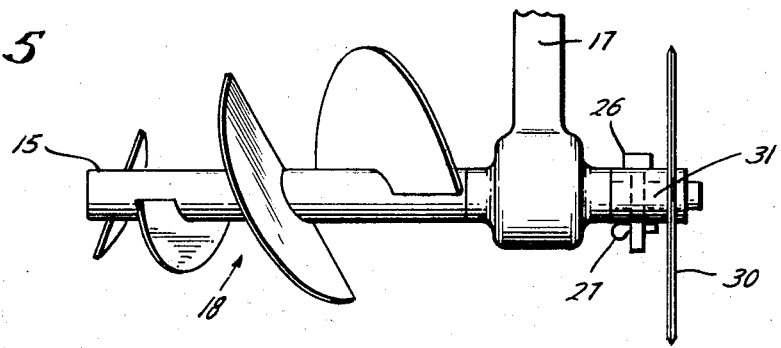
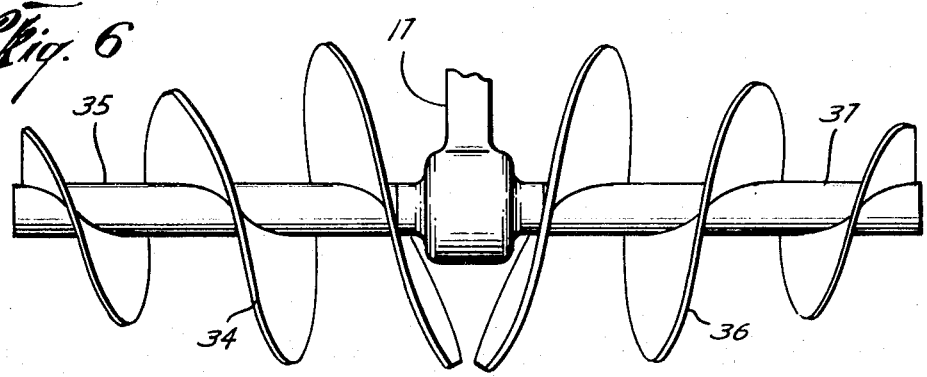
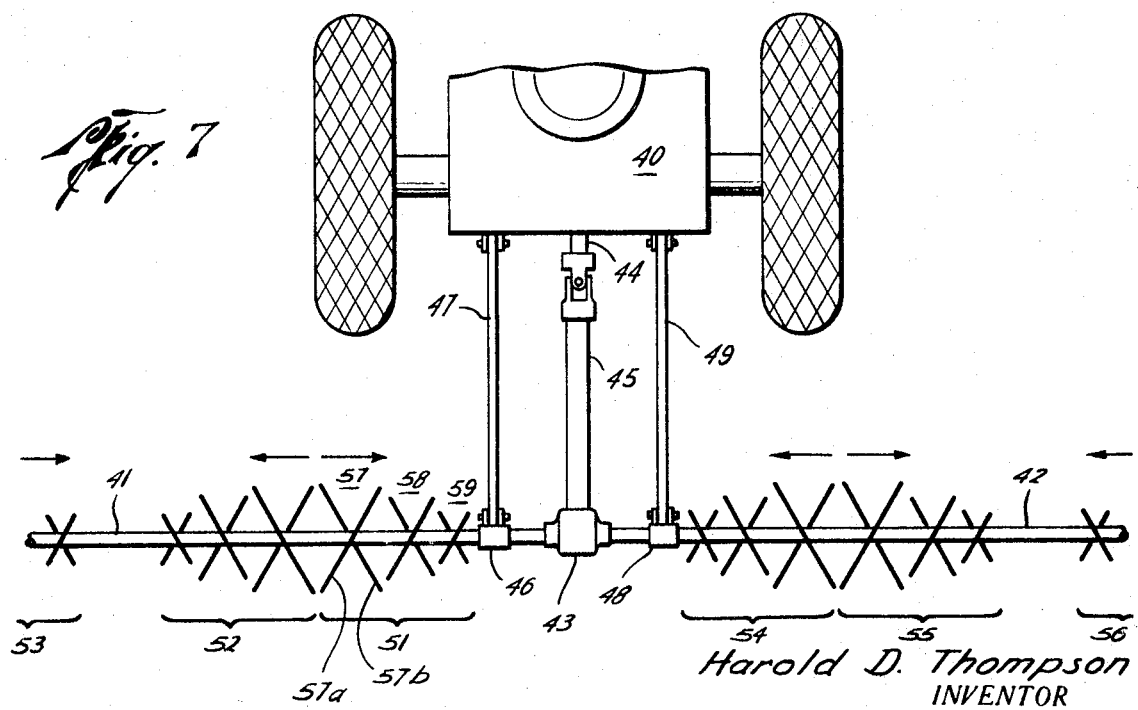

ROTARY TILLER WITH BACKUP PLATE FURROWING MEANS

BACKGROUND OF THE INVENTION

This invention relates to soil working apparatus for forming crop planting rows in previously tilled or plowed soil, for forming levees in a rice field or for cultivating soil in a garden or crop field or the like.

Various types of farm equipment are presently available for plowing the soil and forming the earth into rows in which are to be planted the seeds or starting plants for the crops to be raised. Nevertheless, there is room for improvement. In particular, it would be desirable to have improved forms of apparatus for more efficiently and more rapidly performing the row forming operation.

After the rows are formed and the seeds planted, it is frequently necessary to cultivate the soil from time to time for purposes of cutting the weeds, reconditioning the soil and the like. Present-day cultivating apparatus, however, tends to tear down the crop rows during the cultivation process. It would be desirable, therefore, to have an improved form of cultivating apparatus which cultivates without tearing down the crop rows or ridges.

Apart from the foregoing, most of the present-day row forming equipment is of the type which is adapted to be connected to and drawn by a relatively large size farm tractor. Such equipment including the tractor is relatively expensive and is not entirely convenient for use in vegetable gardens and the like of relatively limited size.

SUMMARY OF THE INVENTION

It is an object of the invention, therefore, to provide new and improved soil working apparatus for efficiently forming crop planting rows in plowed soil.

It is another object of the invention to provide new and improved soil working apparatus for forming levees in rice fields.

It is a further object of the invention to provide new and improved soil working apparatus for cultivating gardens and crop fields.

It is an additional object of the invention to provide an attachment for a garden tiller to provide a new and improved self-propelled, manually guided soil working apparatus for use in vegetable gardens for rapidly and efficiently forming raised planting rows for the vegetable seeds and plants.

In accordance with one form of the invention, soil working apparatus comprises shaft means extending in a generally horizontal plane. Such apparatus also includes means for positioning the shaft means transversely of the direction of movement of the apparatus. Such apparatus further includes means for imparting rotation to the shaft means. The apparatus additionally includes tapered auger means mounted on the shaft means for engaging the earth and in cooperation with a plate, moves the earth longitudinally of the shaft means to form rows as the apparatus passes over the earth.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a perspective view of a representative embodiment of hand-guided soil working apparatus constructed in accordance with the present invention;

FIG. 2 is an enlarged view of one of the auger mechanisms of the FIG. 1 apparatus;

FIG. 3 shows the soil engaging portions of the FIG. 1 apparatus in a disassembled manner;

FIG. 4 is a partially cross-sectional view showing how the soil engaging mechanisms are fastened to the main body of the FIG. 1 apparatus;

FIG. 5 shows a modified form of construction for the soil engaging mechanisms;

FIG. 6 shows a different form of construction for the auger mechanisms; and

FIG. 7 is a plan view of the principal portions of a tractor drawn embodiment of soil forming or working apparatus constructed in accordance with the present invention.

DESCRIPTION OF THE PREFERRED EMBODIMENTS

Referring to FIG. 1, there is shown a representative embodiment of a self-propelled manually guided soil working apparatus 10 constructed in accordance with the present invention. The apparatus 10 includes a body structure 11 having mounted thereon a motor 12 which may be, for example, an internal combustion engine of the gasoline fueled type employed on power lawnmowers. Supported below the forward portion of the body structure 11 are the soil working mechanisms for forming or working plowed soil into rows. The rearward portion of the body structure 11 is supported by a wheel assembly 13 which is attached to the rearward portion of the body structure 11. Extending upwardly and rearwardly from the body structure 11 is a handle assembly 14 by means of which the user of the apparatus 10 can manually guide the apparatus 10 across the field or area to be worked.

The soil working mechanisms include shaft means comprised of a pair of coaxial shaft portions or members 15 and 16 which extend in a generally horizontal plane and at right angles to the direction of movement of the apparatus 10 across the area to be formed or worked. As such, the longitudinal center axes of the shaft members 15 and 16 are parallel to the axis of rotation of the wheels in the wheel assembly 13. Shaft members 15 and 16 are rotatably supported at the lower end of a centrally located support assembly 17 which extends downwardly from the forward portion of the body structure 11. Located within the interior of the support assembly 17 is a linkage mechanism for coupling the drive shaft of the motor 12 to the laterally extending shaft members 15 and 16 for purposes of imparting rotation to such shaft members 15 and 16. Such linkage mechanism may, for example, take the form of a continuous link chain running between a pair of sprocket mechanisms, one of which is driven by the motor 12 and the other of which drives the shaft members 15 and 16.

Mounted on the shaft members 15 and 16 are tapered auger mechanisms 18 and 19 for engaging the earth and moving it longitudinally of the shaft members 15 and 16. Auger mechanism 18 includes a set of four partial disks 18a–18d which are mounted on the shaft member 15 for purposes of moving soil laterally away from the central support assembly 17, which direction of movement is toward the left as viewed in FIG. 1. The auger mechanism 19 includes a set of four partial disks 19a–19d mounted on the shaft member 16 for purposes of moving soil material laterally away from the central support assembly 17, which direction of movement is toward the right as viewed in FIG. 1. Shaft members 15 and 16 rotate in a counterclockwise direction when viewed from the right-hand side of the apparatus as shown in FIG. 1.

FIG. 2 shows the auger mechanism 19 from a somewhat different angle. FIG. 3 shows a plan view of both auger mechanisms 18 and 19. As seen from FIGS. 1-3, the partial disks 18a–18d and 19a–19d are transversely mounted on their respective shaft members 15 and 16 in a spaced apart manner and are obliquely tilted relative to the longitudinal axes of the shaft members 15 and 16. As is further indicated, each partial disk is of semicircular shape and the different partial disks in any given set are located at different rotational positions around the longitudinal center axis of the corresponding shaft member. A typical set of rotational positions is indicated in FIG. 2 wherein the partial disks 19a–19d in set 19 are located at approximately 0°, 90°, 180° and 170° positions with respect to one another. The rotational positions and longitudinal tilt angles of the various disks of a given set are such that the disks can be thought of as corresponding to segments of a continuous helical blade. The analogy is only approximate but nevertheless serves to enable a quick and reasonable visualization of the appropriate angular relationships for purposes of providing a smooth movement of the soil material in a given direction.

It should be further noted that the overall contour of each of the auger mechanisms 18 and 19 is tapered with the direction of taper being such that the contour decreases in the direction in which the soil material is to be moved. In other words, for the auger mechanism 18, for example, the radius of the partial disk 18b is less than the radius of the partial disk 18a, the radius of the partial disk 18c is less than the radius of the partial disk 18b and the radius of the partial disk 18d is less than the radius of the partial disk 18c. This tapering enables the buildup of a row or ridge of earth material adjacent the outer or left-hand end of the shaft member 15. Similar considerations apply to the other auger mechanism 19, a second raised ridge of earth material being built up adjacent the outer or right-hand end of the shaft member 16. In effect, the two auger mechanisms 18 and 19 working together function to cut or form a furrow or groove in the earth, the middle of such furrow being located under the support assembly 17.

It should be noted that each of the partial disks is attached to its shaft member in an off-centered manner such that the length of the flat edge forming the base line of the semicircle defined by the disk is greater on the leading edge side of the shaft member than on the trailing edge side. Thus, for the case of the disk 19a shown in FIG. 2, the dimension $d_1$ is greater than the dimension $d_2$. This provides longer leading edges "e" for the disks 18a–18d and 19a–19d for purposes of cutting the soil material. It should be noted, however, that in some cases the disks may instead be mounted on the shaft members in a centered manner such that the dimension $d_1$ is equal to the dimension $d_2$.

The earth working mechanism of the FIG. 1 apparatus further includes curved plate means, represented by a backup plate or guide plate 20, extending longitudinally of but spaced slightly rearwardly relative to the auger mechanisms 18 and 19 for preventing the earth material from moving rearwardly and for aiding in moving the earth material in the desired lateral directions. Such guide plate 20 is provided with a vertical curvature corresponding approximately to the contour of the space occupied by the auger mechanisms 18 and 19, the concave side of such curvature facing the auger mechanisms 18 and 19. In top plan view, it is V-shaped with the apex of the V being represented by the line 20a. Thus, the curved plate 20 fits closely adjacent the rear of the auger mechanisms to prevent the earth from moving rearwardly and thereby aiding in moving it laterally to form rows. The lower portion of the guide plate 20 is cut or shaped to form a shallow curved "V" to conform with the contour of the bottom of the row, furrow or groove in the earth.

Since the plate 20 is also V-shaped in a vertical plane with its apex 20a adjacent the center of the plate, the outer ends of the plate conform with the shape of the smaller disks 18d and 19d, while the inner part of the plate 20 conforms with the shape of the increasingly larger disks 18c–18a and 19c–19a, respectively. Thus, as previously noted, the plate fits adjacent the disks and prevents the earth from moving through the apparatus, but cooperates to feed the earth longitudinally along the shafts 15 and 16.

Attached to the two ends of the guid plate 20 are forwardly extending arms 21 and 22 which are adapted to be pivotally connected to the outer ends of the shaft members 15 and 16. Considering in detail the manner of connection of the right-hand arm member 22, it is first noted, as indicated in FIG. 4, that the shaft member 16 is of a hollow construction so as to have a longitudinally extending center passage 16a. The arm 22 is bolted to a coupling rod 23 by means of a bolt 24. The external diameter of such rod 23 is less than the internal diameter of the shaft member 16 to allow rotation of the rod 23 in the passageway 16a. A similar type of construction is provided for connecting the left-hand arm 21 to the left-hand end of the shaft member 15, such shaft member 15 also being of a hollow construction.

FIG. 4 further shows the manner in which the shaft member 16 is connected to the central support assembly 17. As there indicated, there is located at the lower extremity of the support assembly 17 a relatively short transverse drive shaft 25 which is mounted in an appropriate bearing assembly and which extends out both the right and left sides of such support assembly 17. This drive shaft 25 is operatively coupled to the linkage mechanism inside the support assembly 17. The inner end of the shaft member 16 is adapted to fit over the right-hand end of this drive shaft 25. A retaining pin or bolt 26 is then inserted through aligned holes in the shaft member 16 and drive shaft 25 and a spring clip type pin 27 is inserted in a transverse hole in the lower end of bolt 26 for locking the shaft member 16 in place. The left-hand shaft member 15 is fastened to the left-hand end of the drive shaft 25 in a similar manner.

Considering now the use of the soil working apparatus of FIGS. 1–4, such apparatus is primarily intended for use in a previously plowed field or garden area for rapidly and efficiently forming well-shaped crop planting rows or ridges for the seeds or starting plants to be planted. Rotation of the auger mechanisms 18 and 19 does two things. First, it serves to propel the soil working apparatus 10 as a whole in the desired forward direction. This is accomplished by the action of the leading edges "e" of the partial disks as they bite into the soil material. Secondly, rotation of the auger mechanisms 18 and 19 moves the soil material laterally to form partial rows along the paths traversed by the outer extremities of the auger mechanisms. The other side of a soil row is formed when the apparatus 10 makes a subsequent trip across the field for purposes of forming the furrow on the other side of such row. By properly guiding the apparatus 10 on its various trips across the field, the desired number of well-formed crop planting rows are created in a relatively short length of time and with a minimum of physical exertion on the part of the operator.

The soil working apparatus 10 of FIGS. 1–4 can also be used to cultivate a previously planted garden or crop field. For this purpose, the backup plate or guide plate 20 is removed from the remainder of the apparatus and is not used. Without such guide plate 20, the partial disks 18a–18d and 19a–19d serve primarily to chop up the dirt and move it to the rear as the apparatus moves in the forwardly direction. Because of the tapered contours of the disk mechanisms 18 and 19, the sides of the previously formed crop rows are not torn down.

Referring now to FIG. 5, there is shown a way in which the apparatus of FIGS. 1–4 can be modified for purposes of forming the outermost soil row adjacent the side of the garden area. In the FIG. 5 modification, only the left-hand auger mechanism 18 is used. The right-hand auger mechanism is disconnected and replaced by a single flat disk 30 which is welded to the end of a short length of pipe 31 which is attached to the right-hand end of the drive shaft 25 (not visible in FIG. 5) by means of the bolt 26 and pin 27 previously considered. In use, the disk 30 acts to contain the soil on the edge side of the garden area, while the auger mechanism 18 operates to move soil material in an inwardly direction for purposes of completing the outermost or edge row.

Referring to FIG. 6, there is shown an alternate form of construction which may be used for the auger mechanisms of the FIG. 1 apparatus. In FIG. 6, the left-hand auger mechanism comprises a helical blade 34 mounted on a laterally extending shaft member 35 and pitched for purposes of moving soil material towards the left as viewed in FIG. 6. In a similar manner, the right-hand auger mechanism comprises a second helical blade 36 which is mounted on a laterally extending shaft member 37, the blade 36 being pitched for purposes of moving soil material to the right as viewed in FIG. 6. Shaft members 35 and 37 are connected to the transverse drive shaft at the lower end of the support assembly 17 in the same manner as shown in FIG. 4. Also, a laterally or transversely extending guide plate is located rearwardly of the auger mechanisms 34 and 36 in the same manner as described in the earlier embodiment.

Referring now to FIG. 7, there is shown a plan view of the principal portions of a tractor drawn embodiment of soil working apparatus constructed in accordance with the present invention. The rearward end of a farm tractor is indicated at 40. The soil working mechanisms include a pair of laterally or transversely extending shaft members 41 and 42 which are coupled to the two ends of a transverse drive shaft (not shown) located in a gear box 43. This drive shaft is in turn coupled to an implement drive shaft 44 of the tractor 40 by means of an intermediate drive shaft 45. The implement drive shaft 44 is driven from the motor of the tractor 40 and rotation thereof causes rotation of the laterally extending shaft members 41 and 42. Shaft member 41 passes through a journal housing 46 which is connected to the rear end of the tractor 40 by a positioning arm 47. In a similar manner, the right-hand shaft member 42 passes through a journal housing 48 which is connected to the rear end of the tractor 40 by a second positioning arm 49. Pivotal connections for vertical articulation are provided at both ends of each of the arms 47 and 49.

Mounted on the left-hand shaft member 41 are three distinct auger mechanisms 51, 52 and 53, only the inner portion of the mechanism 53 being shown in FIG. 7. In a similar manner, three distinct auger mechanisms 54, 55 and 56 are mounted on the right-hand shaft member 42. Considering in detail the auger mechanism 51, for example, such mechanism includes three pairs of partial disks 57, 58 and 59, which pairs are mounted in a spaced apart manner along the shaft member 41. The pair 57, for example, comprises partial disks 57a and 57b which are mounted on opposite sides of the shaft member 41 at a common longitudinal location thereon and are obliquely tilted in opposite directions relative to the longitudinal axis of such shaft 41. Each of the partial disks 57a and 57b are of semicircular shape, similar to the partial disks considered in connection with the FIG. 1 embodiment. The other disk pairs 58 and 59 are of similar construction, except that the disk radius for the pair 58 is less than that for the pair 57, while the disk radius for the pair 59 is less than that for the pair 58. This provides a tapered contour for the auger mechanism 51, which contour decreases towards the right in FIG. 7. The tilt angles of the disks forming the auger mechanism 51 are such as to cause movement of soil material toward the right in FIG. 7. The pairs of partial disks for the mechanism 51 correspond approximately to segments of a double flight helical blade or screw mechanism.

The remaining auger mechanisms 52–56 are constructed in a similar fashion except that the directions of taper and disk tilt are arranged to cause soil movement in the directions indicated by the arrows above the respective auger mechanisms. In this manner, as the tractor 40 pulls the auger mechanisms 51–56 across the field to be worked, a first elevated soil row or ridge is formed intermediate the auger mechanisms 52 and 53, a second elevated soil row is formed intermediate the auger mechanisms 51 and 54 and a third soil row is formed intermediate the auger mechanisms 55 and 56. Thus, multiple soil rows or ridges are formed during a single passage of the tractor 40 across the field.

Note that a backup plate or rear guide plate corresponding to the guide plate 20 of FIG. 1 is not required for the FIG. 7 embodiment. This is because the auger mechanisms of FIG. 7 are being moved across the crop field in the opposite direction relative to their direction of rotation. In FIG. 7, the shaft members 41 and 42 are rotated in a counterclockwise direction when viewed from the right-hand ends thereof. Thus, the rotation of the partial disks opposes the forward movement of the tractor 40. This direction of rotation of the disks tends to move the newly cut earth material toward the tractor 40. The pile up of this material in front of the disks, together with the uncut earth material in front of the disks, forms a barrier which keeps the remainder of the earth material within the confines of the auger mechanisms, wherein it is subjected to the desired lateral movement.

This mode of operation, with the rotation of the auger mechanisms opposing the forward movement of the apparatus, can be used whenever a suitable driving mechanism is available having sufficient power for providing the necessary forward movement. In the FIG. 7 case, the tractor 40 constitutes such a driving mechanism.

By omitting the outer auger mechanisms 52, 53, 55 and 56 and using only the two innermost auger mechanisms 51 and 54, the apparatus of FIG. 7 would take on a form which would be suitable for use in forming the levees in a rice field. In such cases, though, it will sometimes be more desirable to use the helical blade form of auger mechanism as shown in FIG. 6 in place of the partial disk pair form of FIG. 7. In other words, the FIG. 6 embodiment would be particularly well suited for forming rice field levees, provided it were adapted to be pulled by a tractor and provided that the auger mechanisms 34 and 36 were transposed so that the soil material would be fed into the center region in between the two auger mechanisms.

It can be appreciated that the plate 20, shafts 15 and 16 with auger mechanisms 18 and 19 mounted thereon as shown in FIG. 3 may be sold as an attachment for a garden tiller.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A row forming attachment for a soil tiller rotatable drive shaft that extends from both sides of a central support and is transverse to the line of travel of the tiller comprising:
   a. shaft members for securing on the drive shaft for rotation therewith on both sides of the central support;
   b. tapered auger means on each of said shaft members for engaging the soil and propelling the tiller while moving soil longitudinally of said shaft members when the tiller drive shaft is rotated;
   c. backup plate means for extending longitudinally of and in spaced relation rearwardly relative to each of said tapered auger means for engaging and confining the soil as it moves longitudinally of said shaft members to form a row comprising a furrow with mounds on each side; and
   d. means for supporting said backup plate means on said rotatable shaft members to accommodate rotation of said shaft members relative to said backup plate means.

2. The invention of claim 1 wherein said support means pivotally secures said backup plate means to said rotatable shaft members.

3. The invention of claim 1 wherein said tapered auger means comprises:
   a. two sets of partial disks transversely mounted on said shaft members with the disks of each set in a spaced apart manner and tilted relative to the longitudinal axis of said shaft members;
   b. said partial disks of each set being of decreasing radii in the direction in which the soil is too be moved; and
   c. said partial disks in said sets being located at different rotational positions around the longitudinal center axis of said shaft members.

4. The invention of claim 3 wherein said partial disks are attached off center on said shaft members to form a leading edge on said partial disks which is greater than the trailing edge thereof.

5. A row forming attachment for a soil tiller rotatable drive shaft that extends from both sides of a central support and is transverse to the line of travel of the tiller comprising:
   a. shaft members for securing on the drive shaft for rotation therewith on both sides of the central support;
   b. auger means on each of said shaft members, said auger means comprising tapered helical blade means wherein the blade means taper in a direction outwardly from each side of the central support for engaging and moving soil longitudinally of said shaft members and outwardly from each side of the central support when the tiller drive shaft is rotated;

c. backup plate means for extending longitudinally of and in spaced relation rearwardly relative to each of said auger means for engaging and aiding in moving the soil longitudinally of said shaft members and outwardly from each side of the central support to form a row comprising a furrow with mounds on each side; and d. means for supporting said backup plate means on said rotatable shaft members to accommodate rotation of said shaft members relative to said backup plate means.

6. The invention of claim 5 wherein said support means pivotally secures said backup plate means to said rotatable shaft members.

7. The invention of claim 5 wherein said tapered auger means comprises:
a. two sets of partial disks transversely mounted on said shaft members with the disks of each set in a spaced apart manner and tilted relative to the longitudinal axis of said shaft members;
b. said partial disks of each set being of decreasing radii in the direction in which the soil is to be moved; and
c. said partial disks in said sets being located at different rotational positions around the longitudinal center axis of said shaft members.

8. The invention of claim 7 wherein said partial disks are attached off center on said shaft members to form a leading edge on said partial disks which is greater than the trailing edge thereof.

9. A row forming attachment for a soil tiller rotatable drive shaft that extends from both sides of a central support and is transverse to the line of travel of the tiller comprising:
a. shaft members for securing on the drive shaft for rotation therewith on both sides of the central support;
b. tapered auger means on each of said shaft members for engaging the soil and propelling the tiller while moving soil longitudinally of said shaft members when the tiller drive shaft is rotated;
c. backup plate means for extending longitudinally of and in spaced relation rearwardly relative to each of said tapered auger means for engaging and confining the soil as it moves longitudinally of said shaft members to form a row comprising a furrow with mounds on each side, said backup plate:
1. having a lower edge whose outer ends are elevated relative to the lower edge portion therebetween to generally conform with the row;
2. having its outer ends extending forwardly relative to the center of the plate; and
3. being generally concave with the concave facing toward the tapered auger means; and
d. means for supporting said backup plate means on said rotatable shaft members to accommodate rotation of said shaft members relative to said backup plate means.

10. The invention of claim 9 wherein said support means pivotally secures said packup plate means to said rotatable shaft members.

11. The invention of claim 9 wherein said tapered auger means comprises:
a. two sets of partial disks transversely mounted on said shaft members with the disks of each set in a spaced apart manner and tilted relative to the longitudinal axis of said shaft members;
b. said partial disks of each set being of decreasing radii in the direction in which the soil is to be moved; and
c. said partial disks in said sets being located at different rotational positions around the longitudinal center axis of said shaft members.

12. The invention of claim 11 wherein said partial disks are attached off center on said shaft members to form a leading edge on said partial disks which is greater than the trailing edge thereof.

13. A row forming attachment for a soil tiller rotatable drive shaft that extends from both sides of a central support and is transverse to the line of travel of the tiller comprising:

a. shaft members for securing on the drive shaft for rotation therewith on both sides of the central support;
b. auger means on each of said shaft members, said auger means comprising tapered helical blade means wherein the blade means taper in a direction outwardly from each side of the central support for engaging and moving soil longitudinally of said shaft members and outwardly from each side of the central support when the tiller drive shaft is rotated;
c. backup plate means for extending longitudinally of and in spaced relation rearwardly relative to each of said auger means for engaging and aiding in moving the soil longitudinally of said shaft members and outwardly from each side of the central support to form a row comprising a furrow with mounds on each side, said backup plate:
1. having a lower edge whose outer ends are elevated relative to the lower edge portion therebetween to generally conform with the row;
2. having its outer ends extending forwardly relative to the center of the plate; and
3. being generally concave with the concave facing toward the tapered auger means; and
d. means for supporting said backup plate means on said rotatable shaft members to accommodate rotation of said shaft members relative to said backup plate means.

14. The invention of claim 13 wherein said support means pivotally secures the backup plate means to said rotatable shaft members.

15. The invention of claim 13 wherein said tapered auger means comprises:
a. two sets of partial disks transversely mounted on said shaft members with the disks of each set in a spaced apart manner and tilted relative to the longitudinal axis of said shaft members;
b. said partial disks of each set being of decreasing radii in the direction in which the soil is to be moved; and
c. said partial disks in said sets being located at different rotational positions around the longitudinal center axis of said shaft members.

16. The invention of claim 15 wherein said partial disks are attached off center on said shaft members to form a leading edge on said partial disks which is greater than the trailing edge thereof.

17. The invention of claim 6 wherein said pivotal support means includes:
a. arms secured adjacent each end of said backup plate means and extending forwardly relative thereto; and
b. means adjacent the end of each of said arms, said means extending laterally of each of said arms on one side thereof and toward each other for telescopically engaging the outer ends of each of said shaft members to accommodate relative rotation between said shaft members and said means engaged therewith.

18. The invention of claim 10 wherein said pivotal support means includes:
a. arms secured adjacent each end of said backup plate means and extending forwardly relative thereto; and
b. means adjacent the end of each of said arms, said means extending laterally of each of said arms on one side thereof and toward each other for telescopically engaging the outer ends of each of said shaft members to accommodate relative rotation between said shaft members and said means engaged therewith.

19. The invention of claim 14 wherein said pivotal support means includes:
a. arms secured adjacent each end of said backup plate means and extending forwardly relative thereto; and
b. means adjacent the end of each of said arms, said means extending laterally of each of said arms on one side thereof and toward each other for telescopically engaging the outer ends of each of said shaft members to accommodate relative rotation between said shaft members and said means engaged therewith.

* * * * *